(12) United States Patent
Kyung et al.

(10) Patent No.: US 11,778,161 B2
(45) Date of Patent: Oct. 3, 2023

(54) TOF CAMERA DEVICE AND METHOD OF DRIVING THE SAME

(71) Applicant: SAMSUNG ELECTRONICS CO., LTD., Suwon-si (KR)

(72) Inventors: Kyu-Min Kyung, Seoul (KR); Seung-Chui Shin, Yongin-si (KR); Min-Sun Keel, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/398,113

(22) Filed: Aug. 10, 2021

(65) Prior Publication Data

US 2022/0191461 A1    Jun. 16, 2022

(30) Foreign Application Priority Data

Dec. 11, 2020   (KR) .................. 10-2020-0172917

(51) Int. Cl.
*H04N 13/254* (2018.01)
*G01S 17/894* (2020.01)
*H04N 13/296* (2018.01)

(52) U.S. Cl.
CPC ......... *H04N 13/254* (2018.05); *G01S 17/894* (2020.01); *H04N 13/296* (2018.05)

(58) Field of Classification Search
CPC ... H04N 13/254; H04N 13/296; G01S 17/894
USPC .......................................................... 348/46
See application file for complete search history.

(56) References Cited

U.S. PATENT DOCUMENTS

| 5,113,216 A * | 5/1992 | Murata ................. G03B 7/097 396/66 |
| 2012/0236288 A1 | 9/2012 | Stanley |
| 2015/0116460 A1 | 4/2015 | Jouet et al. |
| 2019/0251699 A1 | 8/2019 | Chih et al. |
| 2020/0284883 A1 * | 9/2020 | Ferreira ............... G01S 7/4817 |

FOREIGN PATENT DOCUMENTS

| JP | 2014009997 | 1/2014 |
| KR | 1020120111013 | 10/2012 |
| KR | 101961666 | 3/2019 |

* cited by examiner

*Primary Examiner* — Nguyen T Truong
(74) *Attorney, Agent, or Firm* — F. Chau & Associates, LLC

(57) ABSTRACT

A time of flight (TOF) camera device and a method of operating the same is provided. The time of flight (TOF) camera device includes a pulse generator configured to generate a pulse signal, a light module configured to emit output light to at least one object in response to the pulse signal, a three-dimensional (3D) sensor configured to receive reflected light when the output light is reflected by the at least one object for a first frame, a distance calculator configured to receive an output of the 3D sensor and generate a distance data signal, and a light density control device configured to receive the distance data signal from the distance calculator and output a light density control signal. The light density control signal may adjust the size of an opening in the light module to change a projected area from the output light onto the at least one object.

20 Claims, 22 Drawing Sheets

FIG. 9
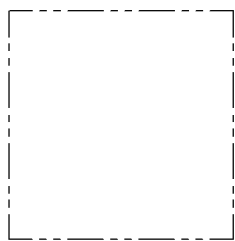
DM1
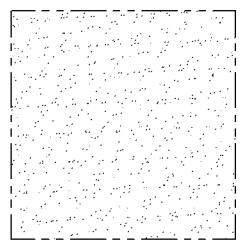
DM2
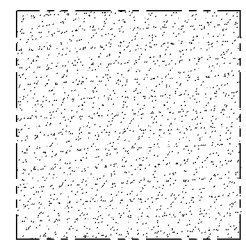
DMS

TOF CAMERA DEVICE AND METHOD OF DRIVING THE SAME

CROSS-REFERENCE TO RELATED APPLICATION

This application claims priority under 35 USC § 119 to Korean Patent Application No. 10-2020-0172917 filed on Dec. 11, 2020 in the Korean Intellectual Property Office, the disclosure of which is incorporated herein by reference in its entirety.

TECHNICAL FIELD

The present disclosure relates to a time of flight (TOF) camera device and a method of driving the same.

DISCUSSION OF THE RELATED ART

A time of flight (TOF) camera may detect the distance of an object from the camera by measuring a phase delay in the light emitted from the camera and bounced off the object. For example, some conventional TOF cameras may modulate a light source with a predetermined frequency, emit the modulated light onto a scene, and measure the phase shift of the light reflected back into the camera in order to generate a depth map at a resolution determined by the camera's design. These types of cameras are widely used in the topographic surveying and object attitude control fields.

SUMMARY

Embodiments of the present disclosure provide a time of flight (TOF) camera device configured to accurately identify a position of an object by controlling light density.

Embodiments of the present disclosure also provide a method of driving the TOF camera device configured to accurately identify a position of an object by controlling light density.

Aspects of the present disclosure are not necessarily limited to those set forth herein, and other aspects of the present disclosure will be apparent to those skilled in the art from the following description.

According to an aspect of the present disclosure, a time of flight (TOF) camera device includes: a pulse generator configured to generate a pulse signal, a light module configured to emit output light to at least one object in response to the pulse signal, a three-dimensional (3D) sensor configured to receive reflected light when the output light is reflected by the at least one object for a first frame, a distance calculator configured to receive an output of the 3D sensor and generate a distance data signal, and a light density control device configured to receive the distance data signal from the distance calculator and output a light density control signal, where the light density control signal controls the size of an opening within the light module through which the output light is emitted to determine a size of a projected area on the at least one object, and where the light module emits the output light to the at least one object for the first frame, wherein the output light has a light density corresponding to the light density control signal.

According to an aspect of the present disclosure, a method of driving a time of flight (TOF) camera device includes: generating a pulse signal, emitting output light to at least one object in response to the pulse signal, receiving reflected light when the output light is reflected by the at least one object for a first frame, generating a distance data signal from the received reflected light and receiving the distance data signal and outputting a light density control signal allowing a size of an area, to which the output light is emitted to the at least one object, to be determined based on the distance data signal.

According to an aspect of the present disclosure, a method of driving a time of flight (TOF) camera device includes: emitting, by a light module, first output light to a first area of a first object for a first frame, changing an area, to which the first output light is emitted to the first object, from the first area to a second area based on first reflected light reflected by the first object for the first frame, emitting, by the light module, second output light to a third area of a second object for a second frame subsequent to the first frame and changing an area, to which the second output light is emitted to the second object, from a third area to a fourth area based on second reflected light reflected by the second object for the second frame, wherein a size of the second area is different from a size of the fourth area.

BRIEF DESCRIPTION OF THE DRAWINGS

The above and other aspects and features of the present disclosure will become more apparent by describing in detail exemplary embodiments thereof with reference to the attached drawings, in which:

FIG. 9 illustrates example depth maps of the first object and the second object according to some embodiments.

DETAILED DESCRIPTION OF THE EMBODIMENTS

Figure 1:
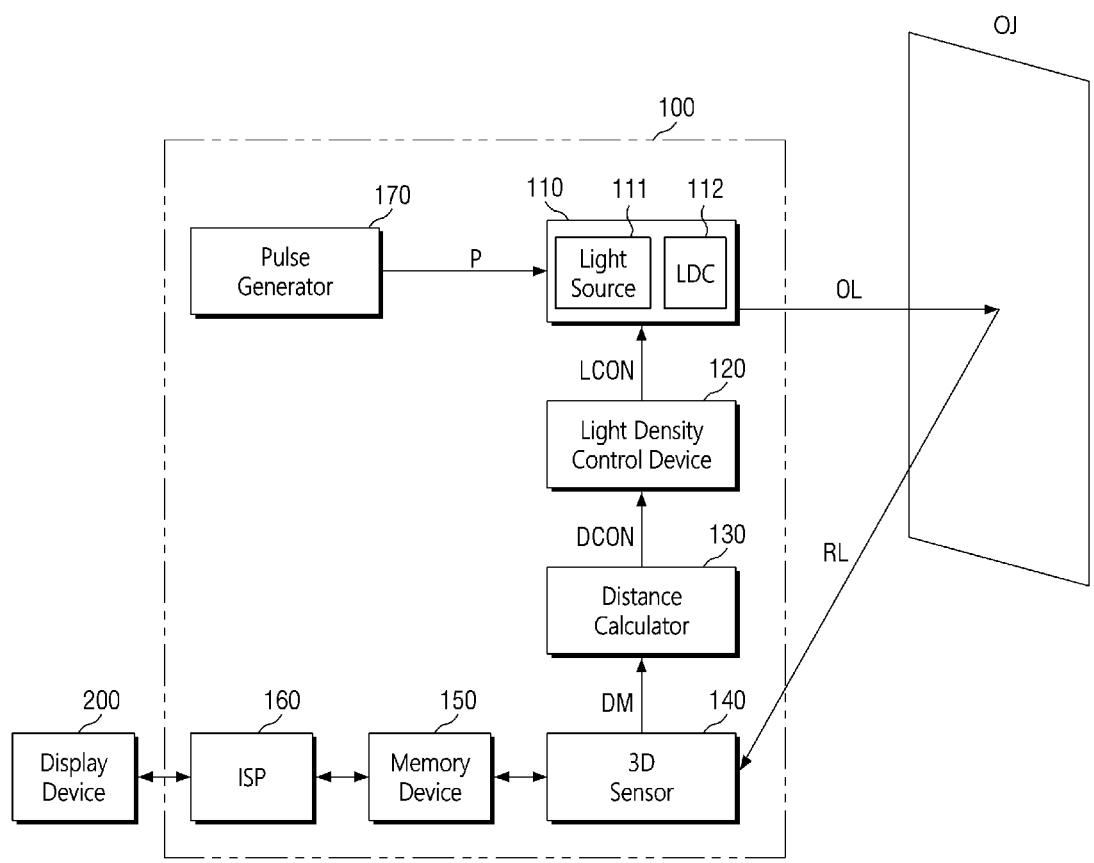
FIG. 1 is a block diagram illustrating a time of flight (TOF) camera device.

Hereinafter, embodiments of the present disclosure will be described with reference to the accompanying drawings. Like reference symbols in the drawings may denote like elements, and to the extent that a description of an element has been omitted, it may be understood that the element is at least similar to corresponding elements that are described elsewhere in the specification.

In conventional phase detection TOF cameras, the accuracy of the TOF camera depends on the modulation frequency, dynamic range, sensitivity, and other properties of the emitted light. Further, if the phase shift is large enough from a very far object, then it may not be possible to determine the distance to the object, as the measured range is determined by a modulo operation on the carrier wavelength (e.g., the phase shift may be large enough that it shifts beyond a full wavelength, yielding an uninterpretable result). In conventional phase detection TOF cameras where the modulation frequency is fixed, it may not be possible to secure accurate results beyond a fixed distance.

The TOF camera device and systems described herein may accurately track the distance of multiple objects over time. Specifically, a TOF camera device according to embodiments of the present disclosure may include a light density control device, which may be configured to determine the distance of one or more objects, and adjust a projected angle of light which determines a corresponding optical area onto the one or more objects, thereby tracking the one or more objects across a wide distance range with increased accuracy.

Figure 2:
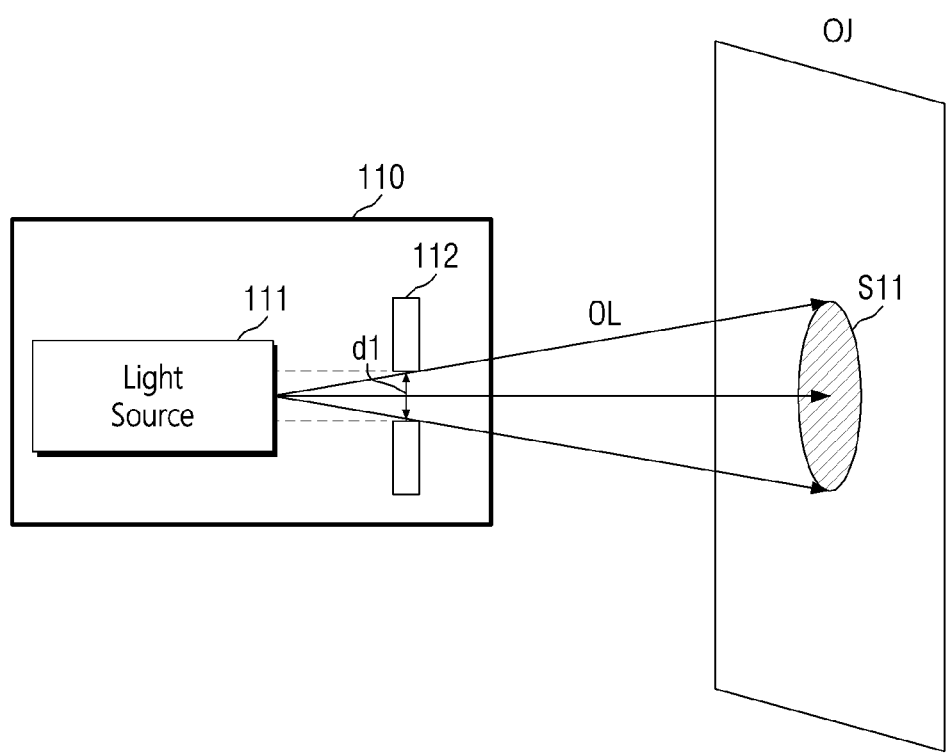
FIG. 2 is a diagram illustrating an optical area of an object according to a size of an opening of a light density controller (LDC) according to some embodiments.
Figure 3:
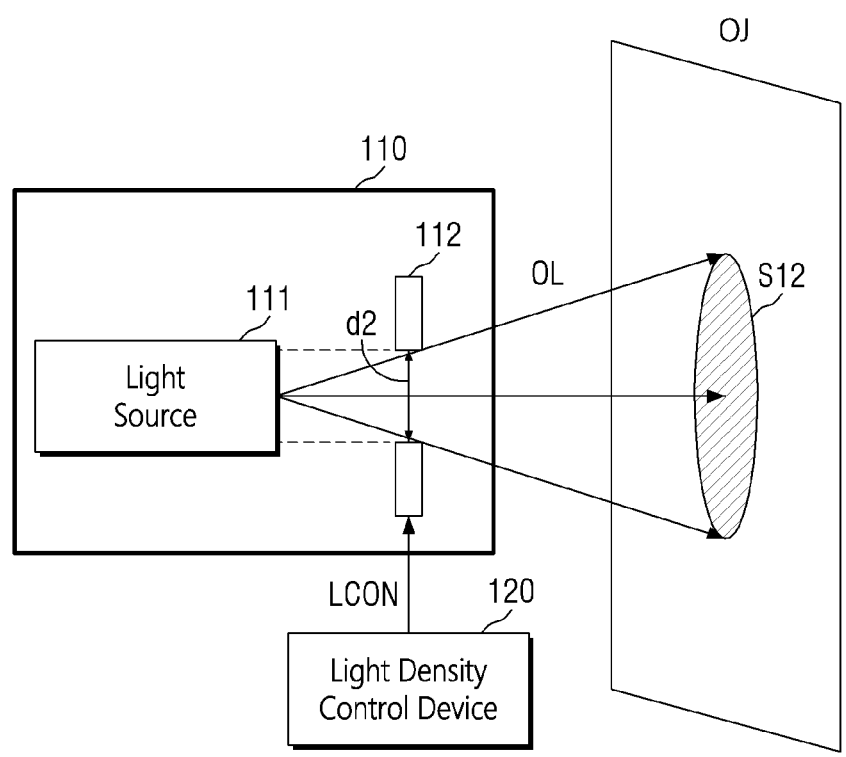
FIG. 3 is a diagram illustrating an optical area of an object according to a size of an opening of an LDC according to some embodiments.
Figure 4:
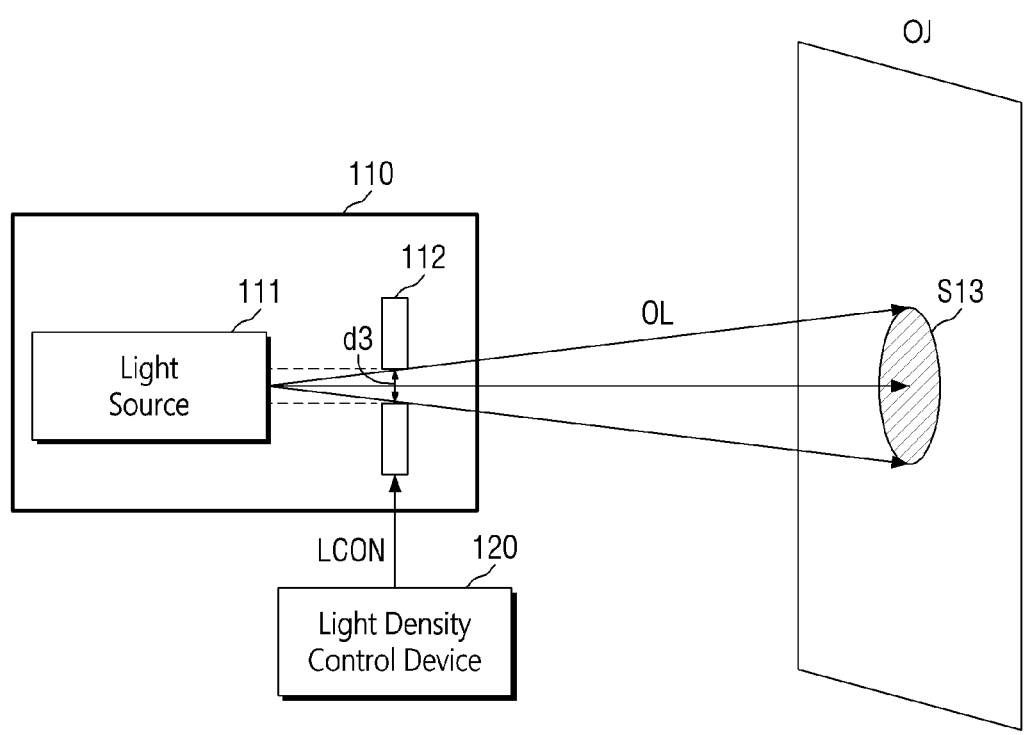
FIG. 4 is a diagram illustrating an optical area of an object according to a size of an opening of an LDC according to some embodiments.

FIG. 1 is a block diagram illustrating a time of flight (TOF) camera device. FIG. 2 is a diagram illustrating an optical area of an object according to a size of an opening of a light density controller (LDC) according to some embodiments. FIG. 3 is a diagram illustrating an optical area of an object according to a size of an opening of an LDC according to some embodiments. FIG. 4 is a diagram illustrating an optical area of an object according to a size of an opening of an LDC according to some embodiments.

Referring to FIG. 1, a TOF camera device 100 may include a light module 110, a light density control device 120, a distance calculator 130, a three-dimensional (3D) sensor 140, a memory device 150, an image signal processor (ISP) 160, and a pulse generator 170.

The light module 110 may include a light source 111 and an LDC 112. The light source 111 may emit output light OL to an object OJ in response to a pulse signal P generated by the pulse generator 170.

The LDC 112 may control an opening thereof, through which the output light OL is emitted, in response to a light density control signal LCON generated by the light density control device 120. For example, the LDC 112 may control the size of the opening, through which the output light OL is emitted, in response to the light density control signal LCON according to a position of the object OJ.

Referring to FIG. 2, the light module 110 may emit the output light OL to the object OJ. In this case, a gap of the LDC 112 may be a first gap d1. In addition, the light module 110 may project the output light OL onto the object OJ over an area of the object; this projected area may be referred to as an optical area, and may be a first area S11.

Referring to FIG. 3, the light density control signal LCON may be changed. In the example illustrated in FIG. 3, the distance between the light module 110 and the object OJ may be less than the distance of the example illustrated in FIG. 2. Further, the LDC 112 may increase a size of the opening of the LDC 112 in response to the light density control signal LCON. The LDC 112 may control the size of the opening, through which the output light OL is emitted, in response to the light density control signal LCON.

In FIG. 3, a gap of the LDC 112 may be a second gap d2, and a size of the second gap d2 may be greater than the first gap d1 (see FIG. 2).

As a result, the optical area of the output light OL emitted onto the object OJ may be increased. For example, a size of the optical area of the output light OL emitted onto the object OJ may be increased from the first area S11 (see FIG. 2) to a second area S12.

Conversely, referring to FIG. 4, a distance between the light module 110 and the object OJ may be a distance greater than the distance between the light module 110 and the object OJ as illustrated in FIG. 2, and a size of the opening of the LDC 112 may be decreased in response to the light density control signal LCON.

In FIG. 4, a gap of the LDC 112 may be a third gap d3. A size of the third gap d3 may be smaller than the size of the first gap d1. The size of the third gap d3 may be smaller than the size of the second gap d2.

As a result, an optical area of the output light OL emitted onto the object OJ may be decreased. For example, a size of the optical area, to which the output light OL is emitted onto the object OJ may be decreased from the first area S11 (see FIG. 2) to a third area S13.

As described above, the size of the optical area of the output light OL emitted onto the object OJ may be changed according to the size of the opening of the LDC 112.

Further referring to FIG. 1, the output light OL may have a constant frequency. For example, a light source in an infrared light wavelength range may be used in the light module 110, but the embodiments are not necessarily limited thereto.

The output light OL emitted to the object OJ may be reflected and received by the 3D sensor 140. A phase of reflected light RL reflected by the object OJ may be changed with reference to the phase of the output light OL.

For example, when the phase of the reflected light RL is compared with a phase of the output light OL emitted by the light source 111, the phase of the reflected light RL may be changed according to the distance to the object OJ.

The 3D sensor 140 may receive the reflected light RL, which is the output light OL reflected by the object OJ, for a first frame. The 3D sensor 140 may store phase difference information about the reflected light RL in the memory device 150.

The 3D sensor 140 may generate time information of the received reflected light RL from the phase difference information between the output light OL of the light module 110 and the reflected light RL reflected by the object OJ. From the time information, the 3D sensor 140 may generate a 3D depth map DM of the object OJ.

A description of the 3D sensor 140 for generating the 3D depth map DM will be described below with reference to FIGS. 5 and 6.

The distance calculator 130 may receive an output of the 3D sensor 140 to generate a distance data signal DCON. In this case, the output of the 3D sensor 140 may be, for example, the 3D depth map DM.

The distance data signal DCON may be a signal based at least in part on the time information between the output light OL and the reflected light RL.

The light density control device 120 may receive the distance data signal DCON from the distance calculator 130 and output the light density control signal LCON in response. The light density control signal LCON may determine a size of an area to which the output light OL emitted by the light module 110. For example, the light density control signal LCON may determine the size of a gap in the LDC 112, thereby projecting the output light OL onto the object OJ in an area, where the area has a size determined by the gap in the LDC 112.

The light density control device 120 may receive the distance data signal DCON to generate the light density control signal LCON. The light density control signal LCON may allow the size of the opening, through which the output light OL of the LDC 112 is emitted, to be adjusted.

The memory device 150 may store information received from the 3D sensor 140. The memory device 150 may transmit the 3D depth map DM, an image, and the phase difference information generated by the 3D sensor 140 to the ISP 160.

The ISP 160 may calculate a distance between the object OJ and the TOF camera device 100 using the phase difference information. The ISP 160 may transmit calculated information or the image to a display device 200. The display device 200 may then display the image.

Figure 5:
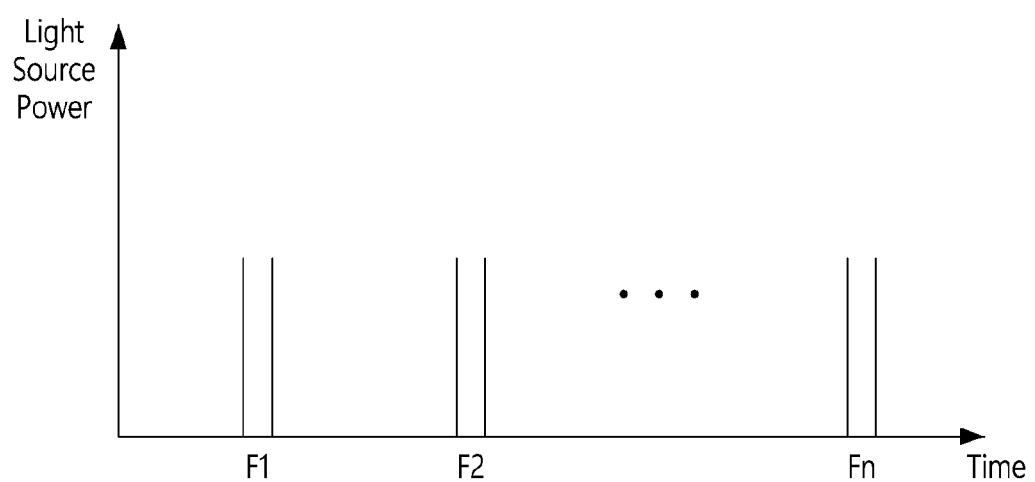
FIG. 5 illustrates an example process of generating a 3D depth map from a 3D sensor according to some embodiments.

FIG. 5 illustrates an example process of generating a 3D depth map from a 3D sensor according to some embodiments. FIG. 6 illustrates an example process of generating a 3D depth map from a 3D sensor according to some embodiments.

Referring to FIG. 5, the 3D sensor 140 may receive and combine rays of reflected light RL reflected by the object to generate a 3D depth map DM.

For example, the 3D sensor 140 may receive the rays of the reflected light reflected by the object OJ for a first frame. The 3D sensor 140 may combine the rays of the reflected light to generate the 3D depth map DM.

Figure 6:
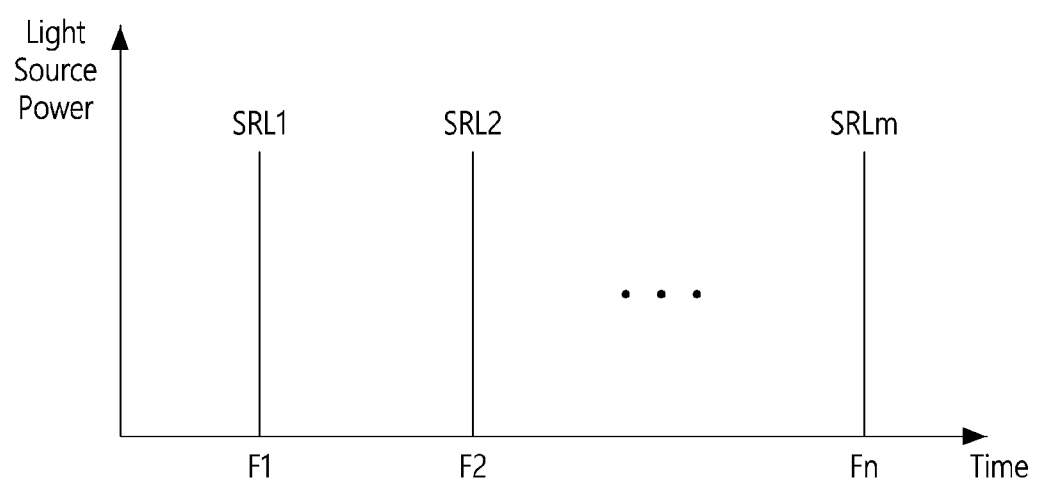
FIG. 6 illustrates an example process of generating a 3D depth map from a 3D sensor according to some embodiments.

Referring to FIG. 6, unlike FIG. 5, the 3D sensor 140 may generate a 3D depth map DM in which rays of reflected light RL reflected by the object are successively combined.

For example, the 3D sensor 140 may receive multiple rays of the reflected light reflected by the object OJ for a first frame. The 3D sensor 140 may successively combine the multiple rays of the reflected light to generate single rays SRL1 to SRLm of reflected light so as to generate the 3D depth map DM.

Figure 7:
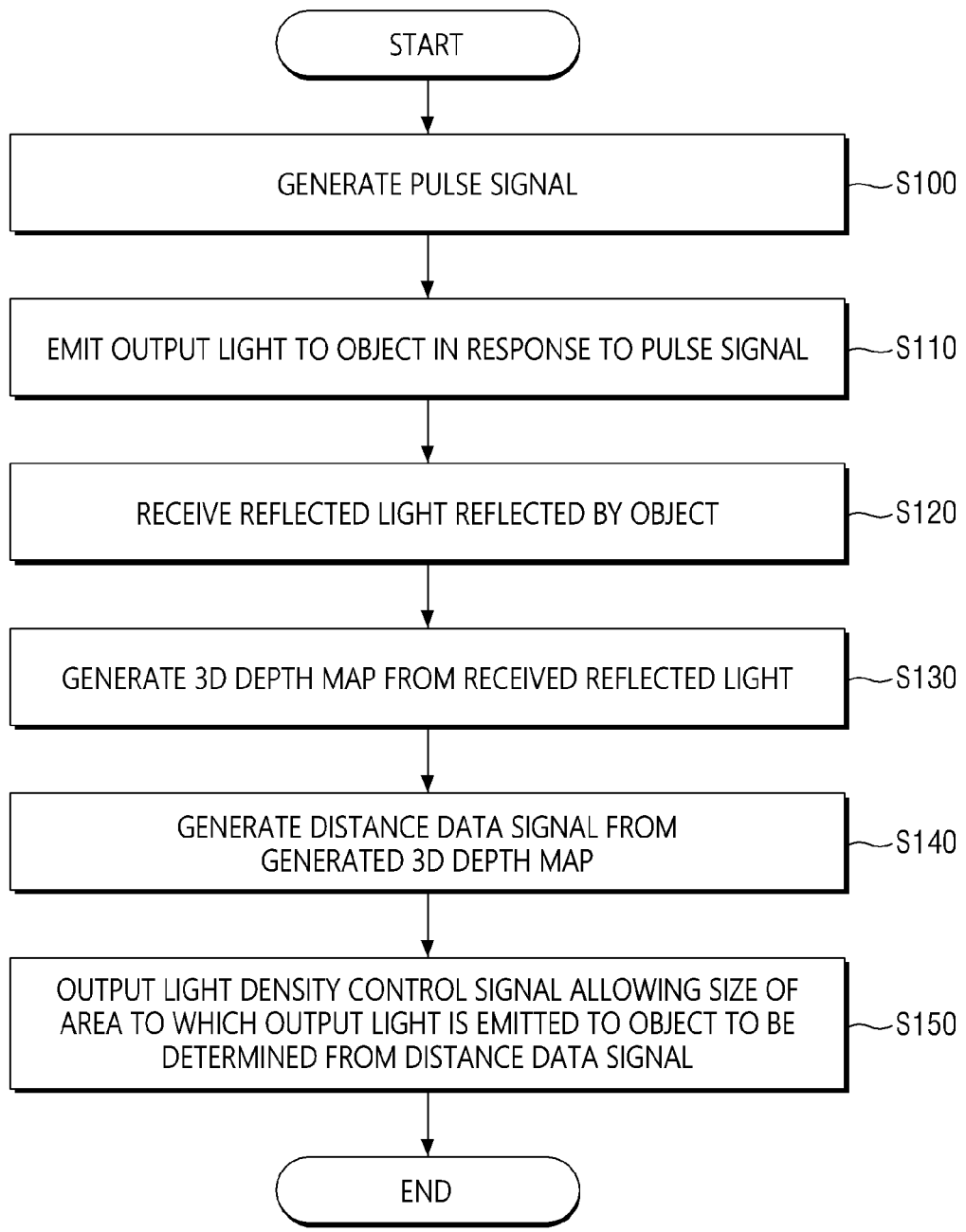
FIG. 7 is a flowchart of a method of driving the TOF camera device.

FIG. 7 is a flowchart illustrating a method of driving the TOF camera device.

Referring to FIG. 7, a pulse signal is generated (S100).

Referring to FIG. 1, the pulse generator 170 may generate a pulse signal P. Hereinafter, the method of driving the TOF camera device according to embodiments of the present disclosure will be described using the structure of the TOF camera device 100 described above. However, the embodiments are not necessarily limited thereto.

Next, output light is emitted to the object in response to the pulse signal (S110).

Referring to FIG. 1, the light module 110 may emit output light OL to the object OJ in response to the pulse signal P generated by the pulse generator 170. For example, the light source 111 of the light module 110 may emit the output light OL to the object OJ in response to the pulse signal P.

Next, the reflected light reflected by the object is received by the 3D sensor 140 (S120).

Referring to FIG. 1, the 3D sensor 140 may receive the reflected light RL reflected by the object OJ.

Next, a 3D depth map is generated using the received reflected light (S130).

Referring to FIG. 1, the 3D sensor 140 may generate time information of the received reflected light RL on the basis of phase difference information between the output light OL of the light module 110 and the reflected light RL reflected by the object OJ. The 3D sensor 140 may generate a 3D depth map DM of the object OJ from the time information.

Referring to FIG. 6, in a case in which the 3D sensor 140 generates a 3D depth map DM, multiple rays of reflected light RL reflected by the object OJ may be successively combined to generate single rays SRL1 to SRLm of the reflected light so as to generate the 3D depth map DM. For example, the 3D depth map DM may be generated using the single rays SRL1 to SRLm of the reflected light for each of frames F1 to Fn.

Referring to FIG. 5, in the case in which the 3D sensor 140 generates a 3D depth map DM, the rays of reflected light reflected by the object OJ may be combined to generate the 3D depth map DM.

Next, a distance data signal is generated from the generated 3D depth map (S140).

Referring to FIG. 1, the distance calculator 130 may generate a distance data signal DCON. The distance calculator 130 may receive the 3D depth map DM, output from the 3D sensor 140, to generate the distance data signal DCON.

Finally, a light density control signal may be output which allows a size of an area to which the output light is emitted onto the object to be determined using the distance data signal (S150).

Referring to FIG. 1, the light density control device 120 may generate a light density control signal LCON. The light density control device 120 may determine the size of the area to which the output light OL emitted by the light module 110 onto the object. The light density control device 120 may receive the distance data signal DCON and output the light density control signal LCON on the basis of the distance data signal DCON.

Accordingly, the LDC 112 may adjust a size of the opening thereof through which the output light OL is emitted in response to the light density control signal DCON. The output light OL corresponding to the light density control signal DCON may be emitted to the object OJ.

In FIGS. 1 to 7, the case in which one object OJ is present for the first frame has been described, and hereinafter, an example in which two objects are present for the first frame will be described. Hereinafter, descriptions of the same or similar components as those of FIGS. 1 to 7 will be omitted or only briefly described, and differences therebetween will be mainly described.

Figure 8:
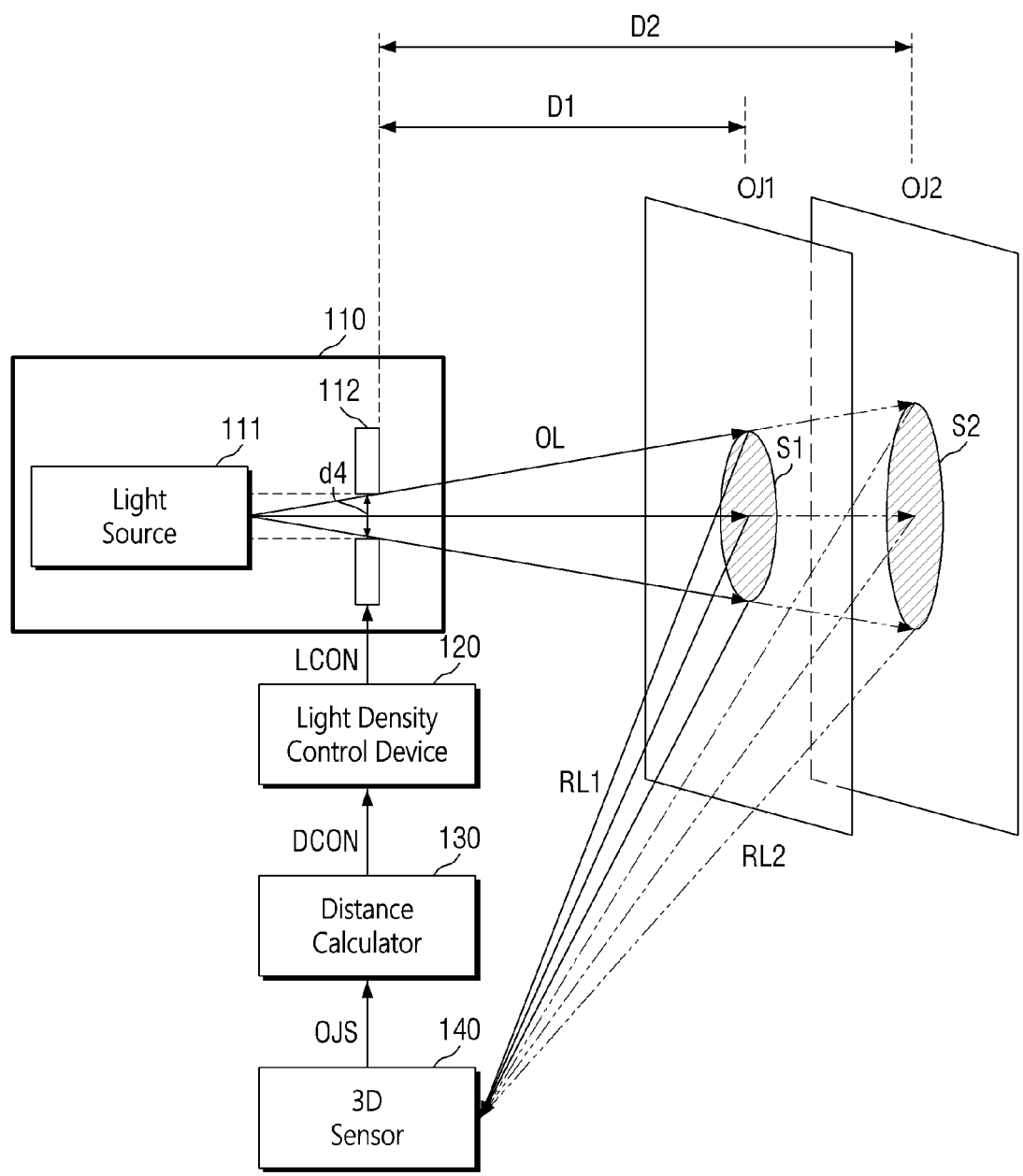
FIG. 8 is a diagram illustrating an optical area of a first object and an optical area of a second object according to a size of the opening of the LDC according to some embodiments.
Figure 10:
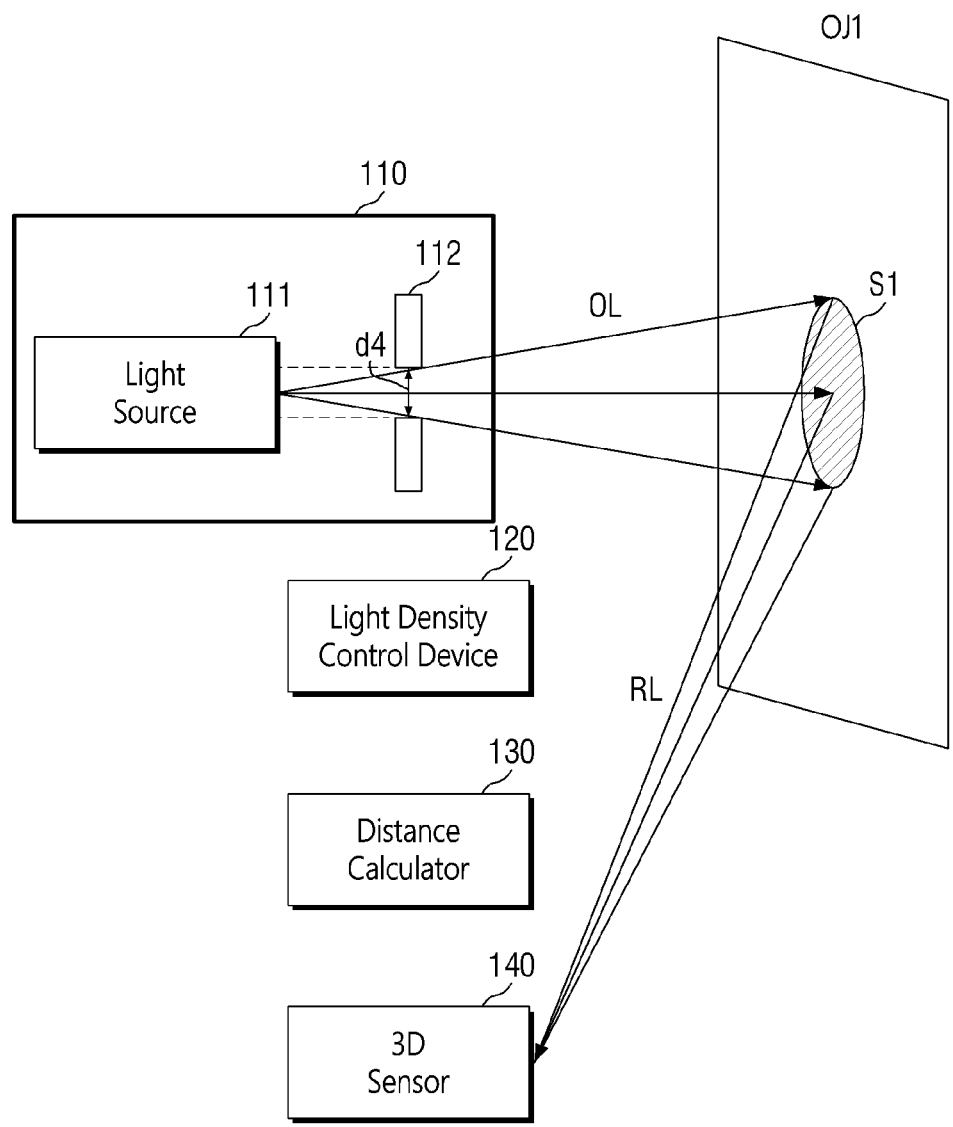
FIG. 10 is a diagram illustrating a case in which the first object of FIG. 8 is selected.
Figure 11:
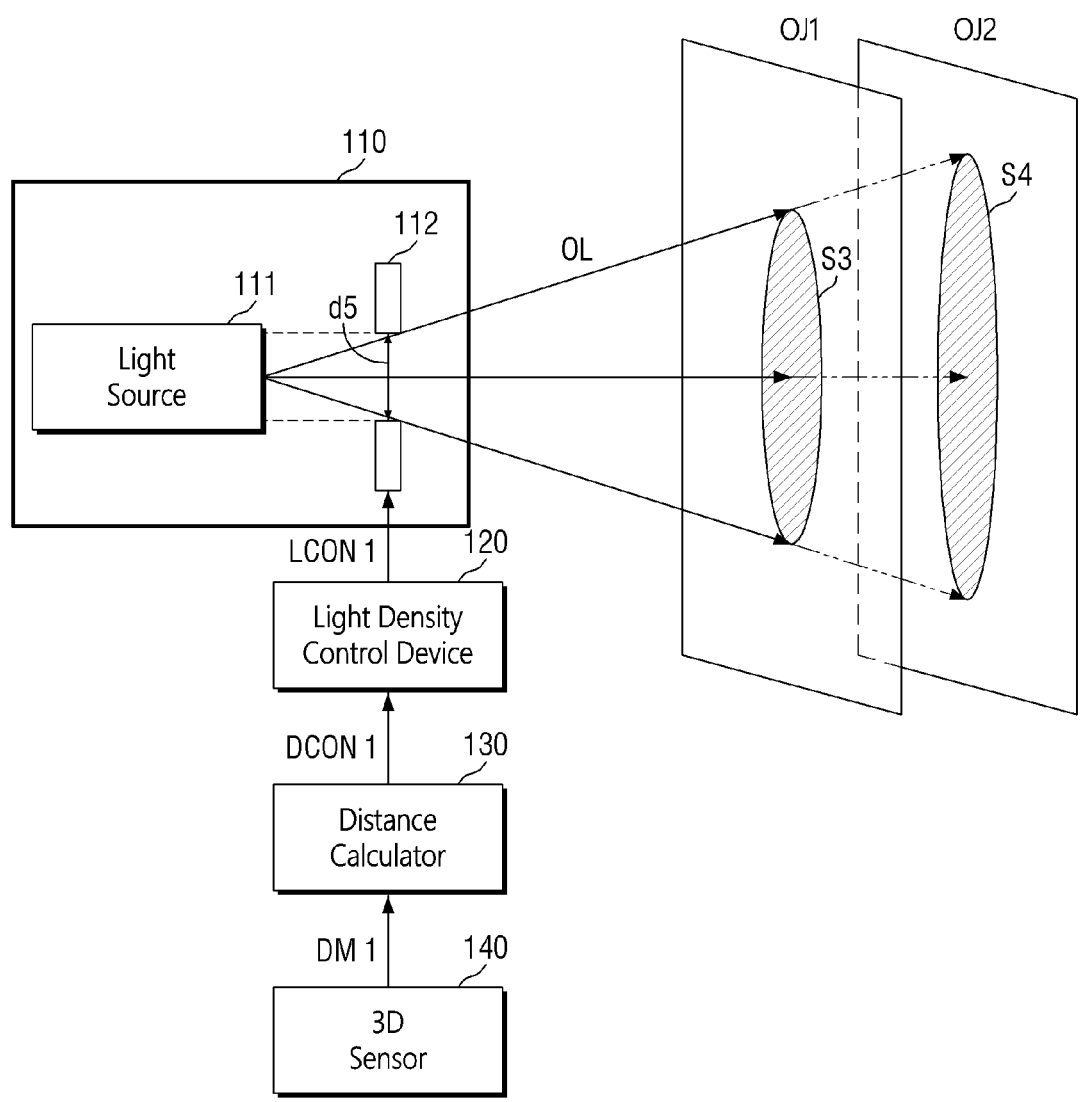
FIG. 11 is a diagram illustrating an optical area of the first object and an optical area of the second object according to FIG. 10.
Figure 12:
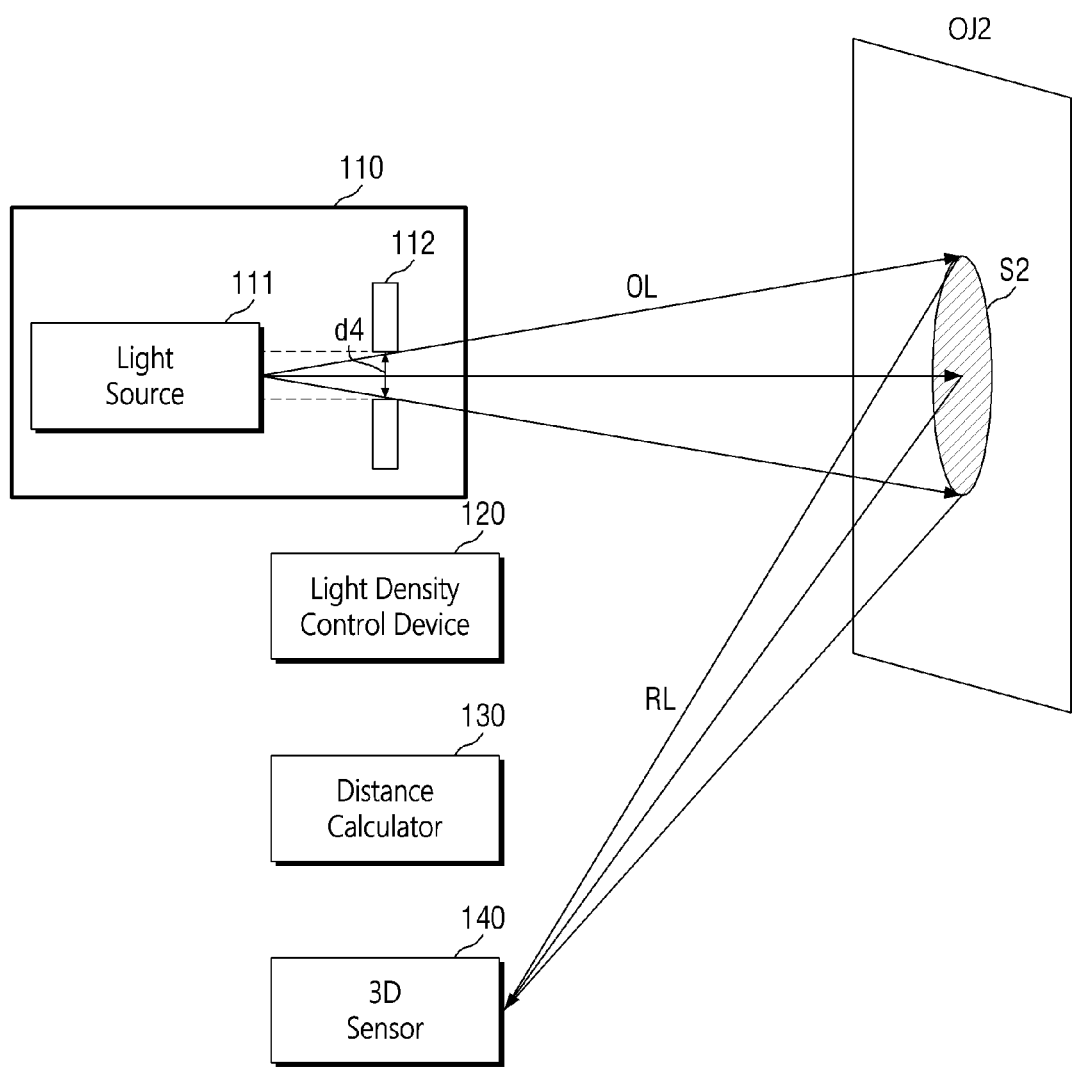
FIG. 12 is a diagram illustrating a case in which the second object of FIG. 8 is selected.
Figure 13:
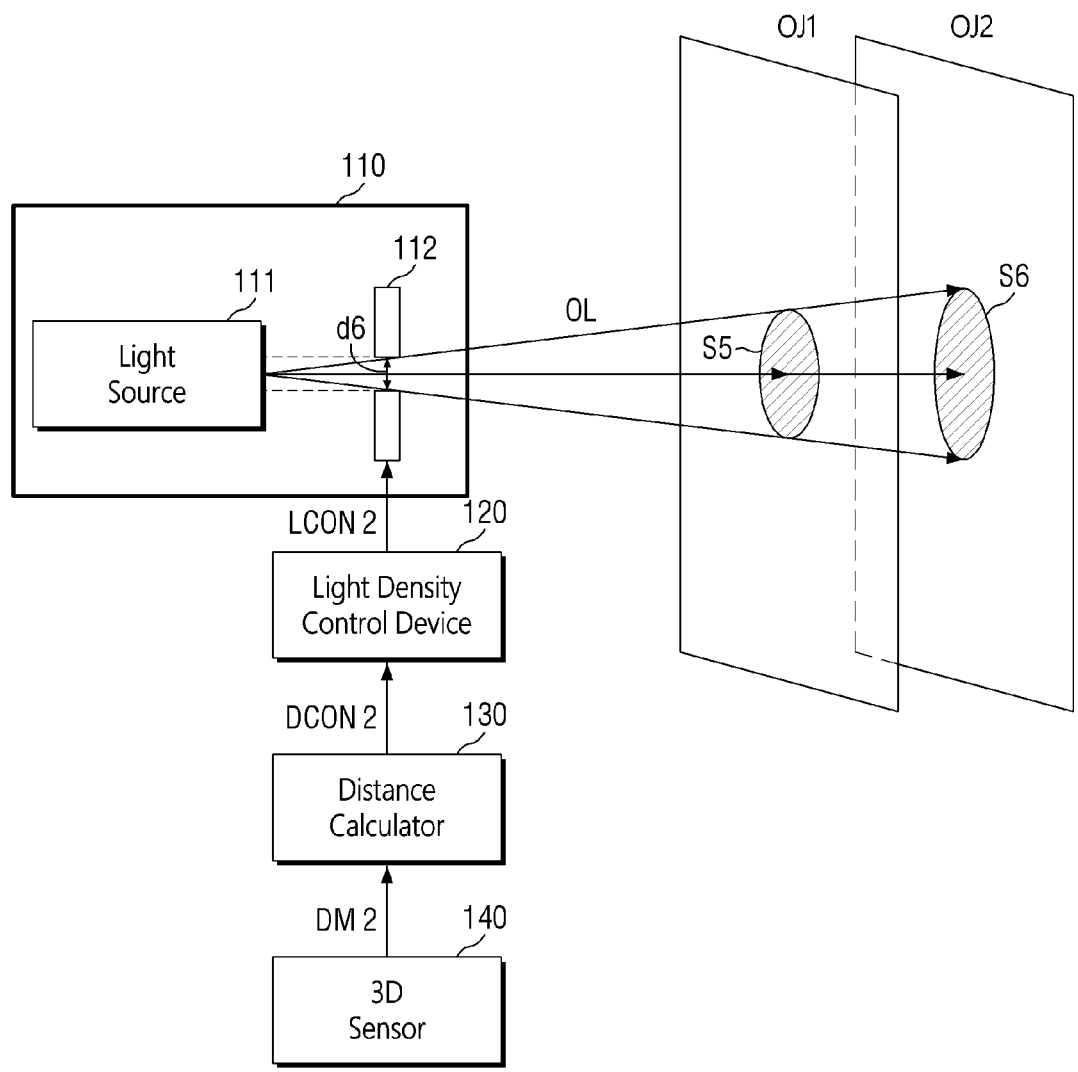
FIG. 13 is a diagram illustrating an optical area of the first object and an optical area of the second object according to FIG. 12.

FIG. 8 is a diagram illustrating an optical area of a first object and an optical area of a second object according to a size of the opening of the LDC according to some embodiments. FIG. 9 illustrates example depth maps of the first object and the second object according to some embodiments. FIG. 10 is a diagram illustrating a case in which the first object of FIG. 8 is selected. FIG. 11 is a diagram illustrating an optical area of the first object and an optical area of the second object according to FIG. 10. FIG. 12 is a diagram illustrating a case in which the second object of FIG. 8 is selected. FIG. 13 is a diagram illustrating an optical area of the first object and an optical area of the second object according to FIG. 12.

Referring to FIG. 8, a first object OJ1 may be separated from the light module 110 by a first distance D1, and a second object OJ2 may be separated from the light module 110 by a second distance D2 greater than the first distance D1.

For a first frame, the light source 111 may emit output light OL to the first object OJ1 and the second object OJ2 in response to a pulse signal P. For example, the output light OL emitted by the light module 110 may be emitted to both of the first object OJ1 and the second object OJ2.

In this case, an area to which the output light OL is emitted onto the first object OJ1 may be a first area 51, and an area to which the output light OL is emitted onto the second object OJ2 may be a second area S2.

The 3D sensor 140 may receive first reflected light RL1 when the output light OL is reflected by the first object OJ1, and may receive a second reflected light RL2 when the output light OL is reflected by the second object OJ2 for the first frame. The 3D sensor 140 may combine a depth of the first object OJ1 and a depth of the second object OJ2 to generate a 3D depth map OJS.

Referring to FIG. 9, since the first object OJ1 is positioned at a first distance D1, which is relatively closer to the light module 110 than the second object OJ2, a depth map thereof may be generated with a flood depth. Since the second object OJ is positioned at a second distance D2, which is relatively farther from the light module 110 than the first object OJ, a depth map thereof may be generated with a spot depth. When the depth of the first object OJ1 and the depth of the second object OJ are combined, a depth map DMS which is more precise than the depth map with the spot depth of the second object may be generated.

Referring again to FIG. 8, the distance calculator 130 may receive a 3D depth map OJS in which the first object OJ1 and the second object OJ2 are combined to generate a distance data signal DCON. The light density control device 120 may receive the distance data signal DCON and output a light density control signal LCON on the basis of the distance data signal DCON.

For example, when the first object OJ1 and the second object OJ2 are present, the light density control device 120 may select either of the first object OJ1 and the second object OJ2 and output the light density control signal LCON on the basis of the selected object for the first frame.

Hereinafter, an example in which the light density control device 120 selects the first object OJ1 and outputs a first light density control signal LCON1 on the basis of the first object OJ1 will be described with reference to FIGS. 10 and 11.

Accordingly, an example in which optical areas to which output light OL is emitted onto the first object OJ1 and onto the second object OJ2 are changed according to the first light density control signal LCON1, will be described.

Referring to FIGS. 10 and 11, the distance calculator 130 may receive a 3D depth map DM1 generated by the 3D sensor 140 to generate a first distance data signal DCON1. Since the first object OJ1 is separated from the light module 110 by the first distance D1, the distance calculator 130 may generate the first distance data signal DCON1.

The light density control device 120 may receive the first distance data signal DCON1 generated by the distance calculator 130 and generate the first light density control signal LCON1. For example, the light density control device 120 may generate the first light density control signal LCON1 to correspond to the first distance data signal DCON1.

The first light density control signal LCON1 may be used to determine the areas to which the output light OL is emitted by the light module 110 onto the first object OJ1 and onto the second object OJ2 on the basis of the first distance data signal DCON1.

The LDC 112 may adjust a size of the opening thereof through which the output light OL is emitted in response to the first light density control signal LCON1.

A gap of the opening of the LDC 112 due to the first light density control signal LCON1 may be a second gap d5. A size of the second gap d5 may be greater than a first gap d4.

As described above, since the gap of the opening of the LDC 112 becomes the second gap d5, an optical area, to which the output light OL is emitted onto the first object OJ1 may be changed to a third area S3. For example, the optical area, to which the output light OL is emitted onto the first object OJ1 may be changed from the first area 51 to the third area S3 according to the first light density control signal LCON1. A size of the third area S3 may be greater than a size of the first area 51.

Similarly, since the gap of the opening of the LDC 112 becomes the second gap d5, an optical area, to which the output light OL is emitted onto the second object OJ2 may be changed to a fourth area S4. For example, the optical area, to which the output light OL is emitted onto the second object OJ2 may be changed from the second area S2 to the fourth area S4 according to the first light density control signal LCON1. A size of the fourth area S4 may be greater than a size of the second area S2.

Next, an example in which the light density control device 120 selects the second object OJ2 and outputs a second light density control signal LCON2 on the basis of the second object OJ2 will be described with reference to FIGS. 12 and 13.

An example in which optical areas to which output light OL emitted onto the first object OJ1 and the second object OJ2 are changed according to the second light density control signal LCON2 will now be described.

The distance calculator 130 may receive a 3D depth map DM2 generated by the 3D sensor 140 to generate a second distance data signal DCON2. Since the second object OJ2 is separated from the light module 110 by a second distance D2 which is greater than a first distance D1, the distance calculator 130 may generate the second distance data signal DCON2.

The light density control device 120 may receive the second distance data signal DCON2 generated by the distance calculator 130 to generate the second light density control signal LCON2. For example, the light density control device 120 may generate the second light density control signal LCON2 to correspond to the second distance data signal DCON2.

The second light density control signal LCON2 may be used to determine sizes of the areas to which the output light OL is emitted by the light module 110 is emitted onto the second object OJ2 and the first object OJ1 on the basis of the second distance data signal DCON2.

The LDC 112 may adjust a size of the opening, through which the output light OL is emitted, in response to the second light density control signal LCON2.

In response to the second light density control signal LCON2, a gap of the opening of the LDC 112 may become a third gap d6. A size of the third gap d6 may be smaller than the size of the first gap d4 (see FIG. 10).

Accordingly, since a size of the opening of the LDC 112 becomes the third gap d6, an optical area, to which the output light OL is emitted onto the second object OJ2 may be changed to a sixth area S6. The optical area, to which the output light OL is emitted onto the second object OJ2 may be changed from the second area S2 to the sixth area S6 according to the second light density control signal LCON2. The sixth area S6 may be smaller than the second area S2. In other words, the second area S2 may be greater than the sixth area S6.

Similarly, since the size of the opening of the LDC 112 becomes the third gap d6, an optical area, to which the output light OL is emitted onto the first object OJ1 may be changed to a fifth area S5. The optical area, to which the output light OL is emitted onto the first object OJ1 may be changed from the first area 51 to the fifth area S5 according to the second light density control signal LCON2. The fifth area S5 may be smaller than the first area 51. In other words, the first area 51 may be greater than the fifth area S5.

Figure 14:
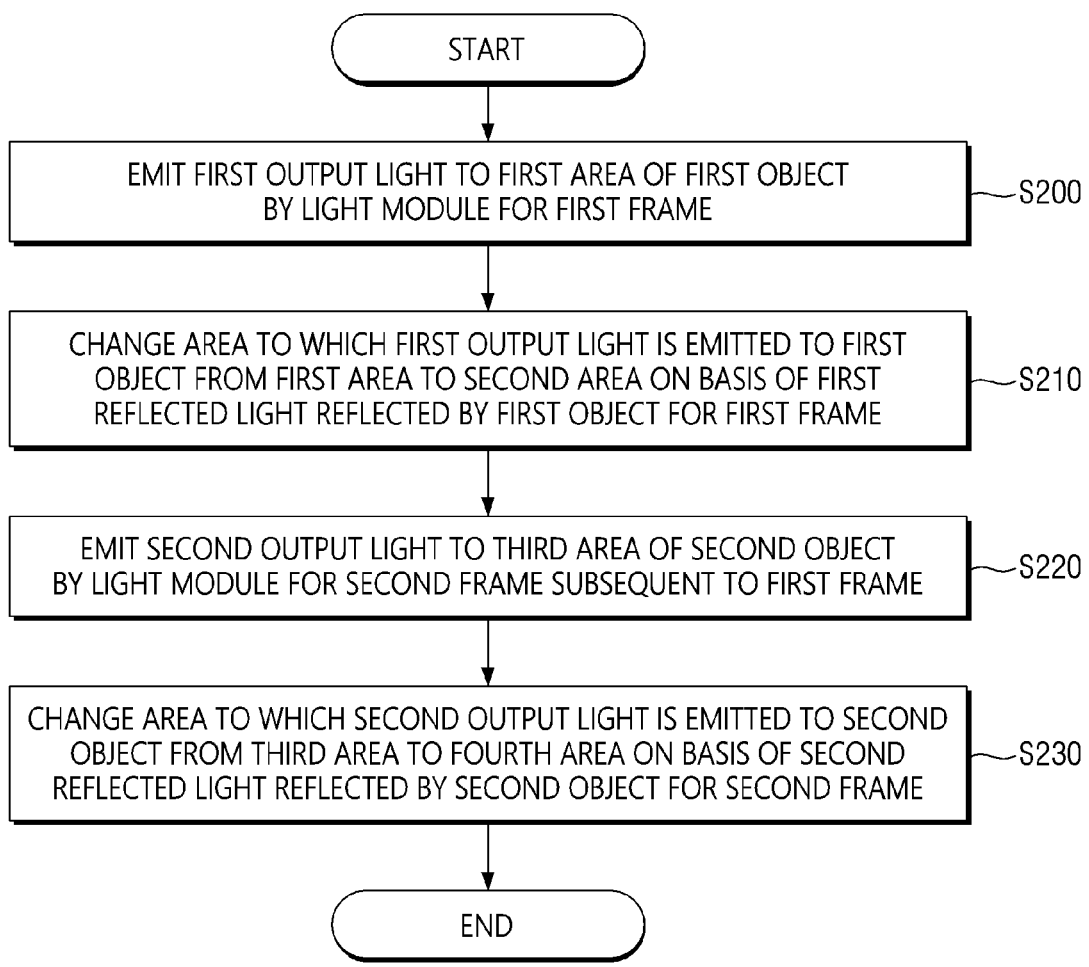
FIG. 14 is a flowchart of a method of driving the TOF camera device according to some embodiments.
Figure 15:
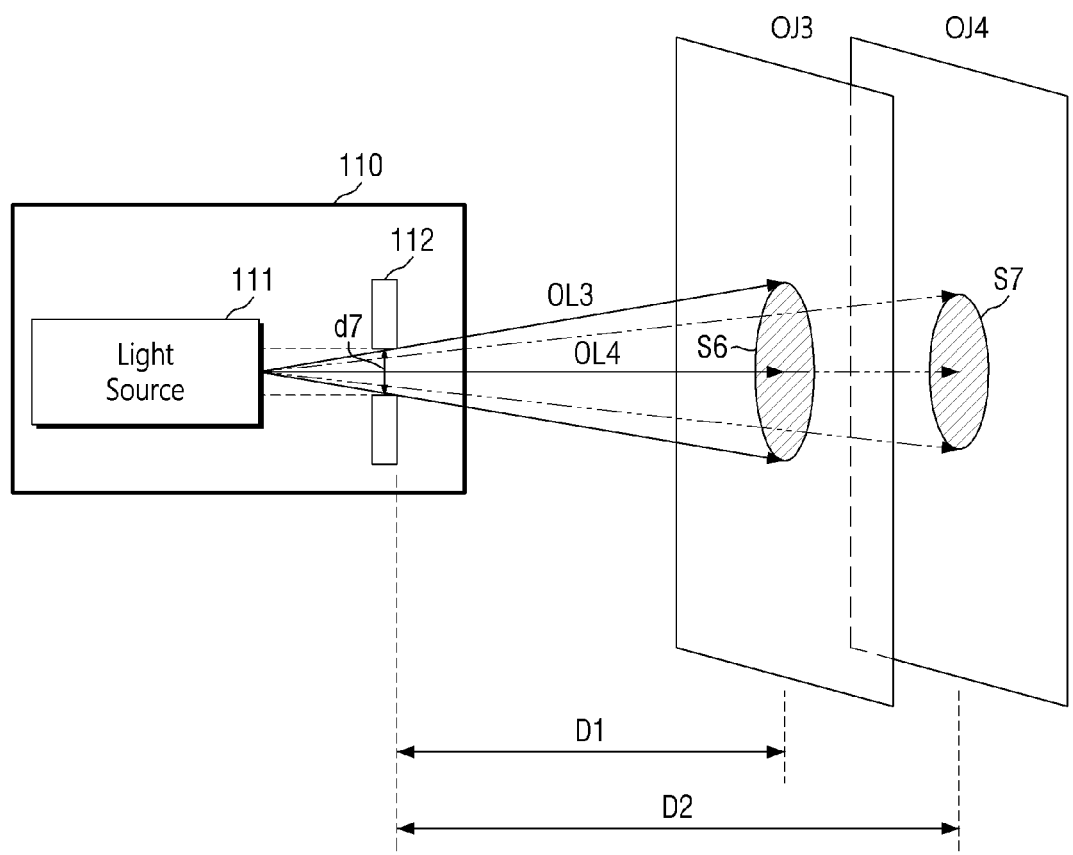
FIG. 15 is a diagram illustrating optical areas of a first object and a second object according to a size of the opening of the LDC according to some embodiments.
Figure 16:
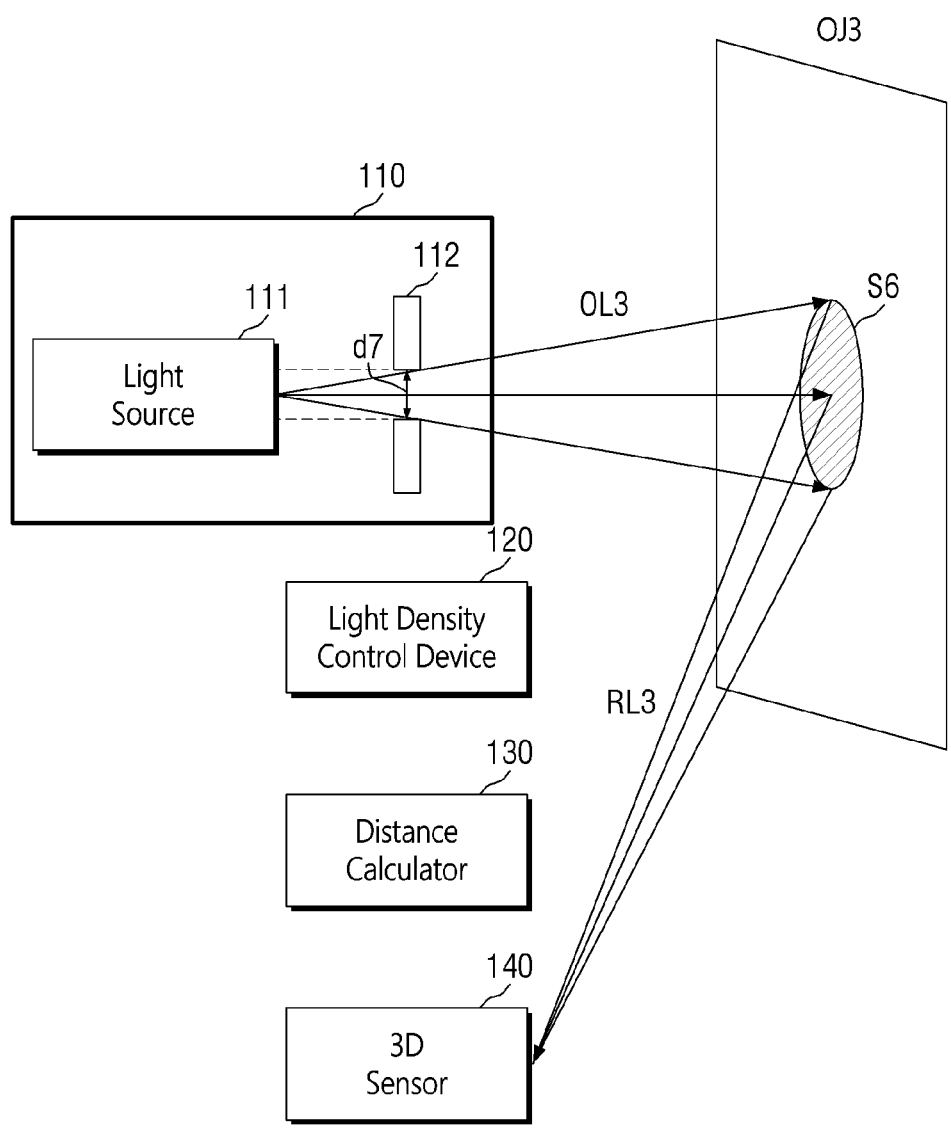
FIG. 16 is a diagram illustrating a state in which output light is emitted to the first object for a first frame.
Figure 17:
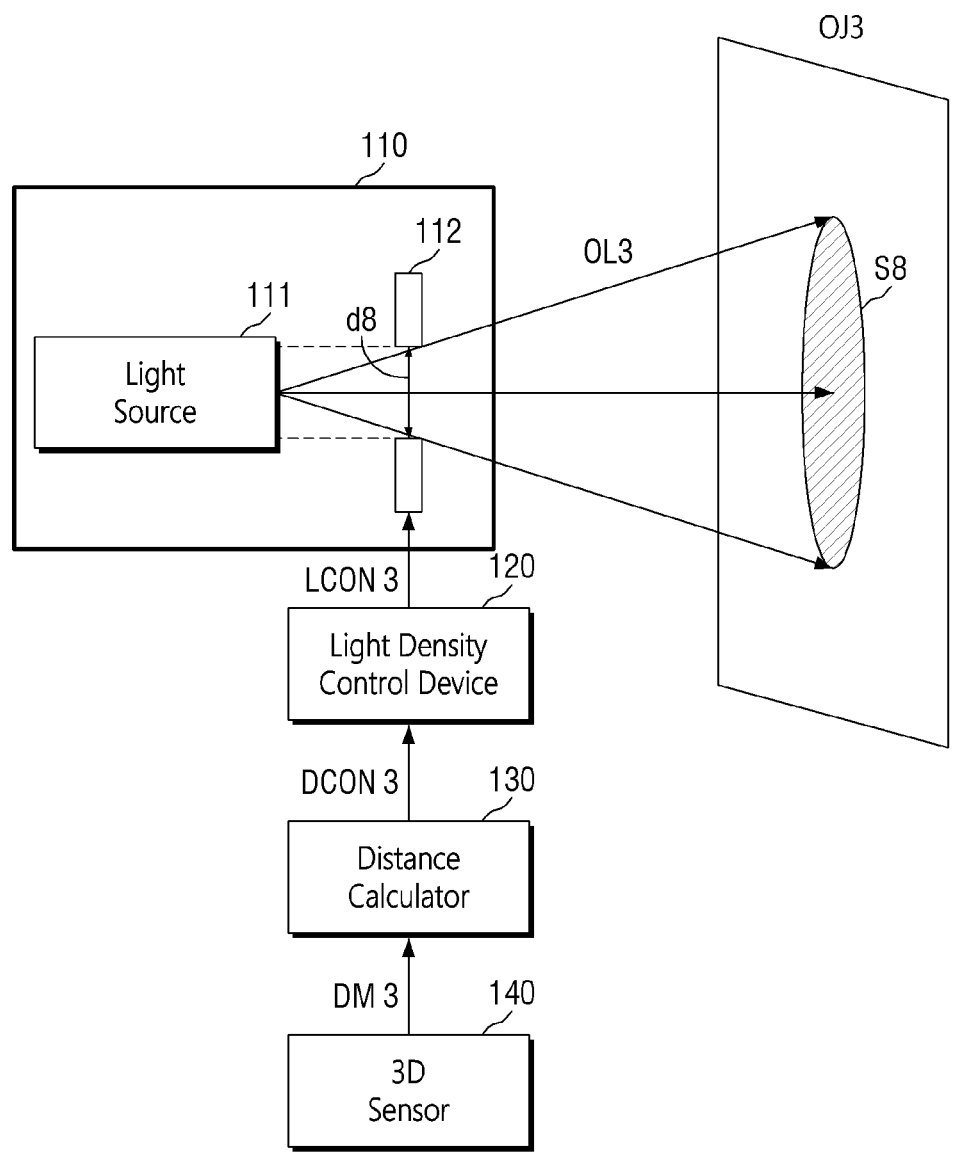
FIG. 17 is a diagram illustrating an optical area of the first object according to FIG. 16.
Figure 18:
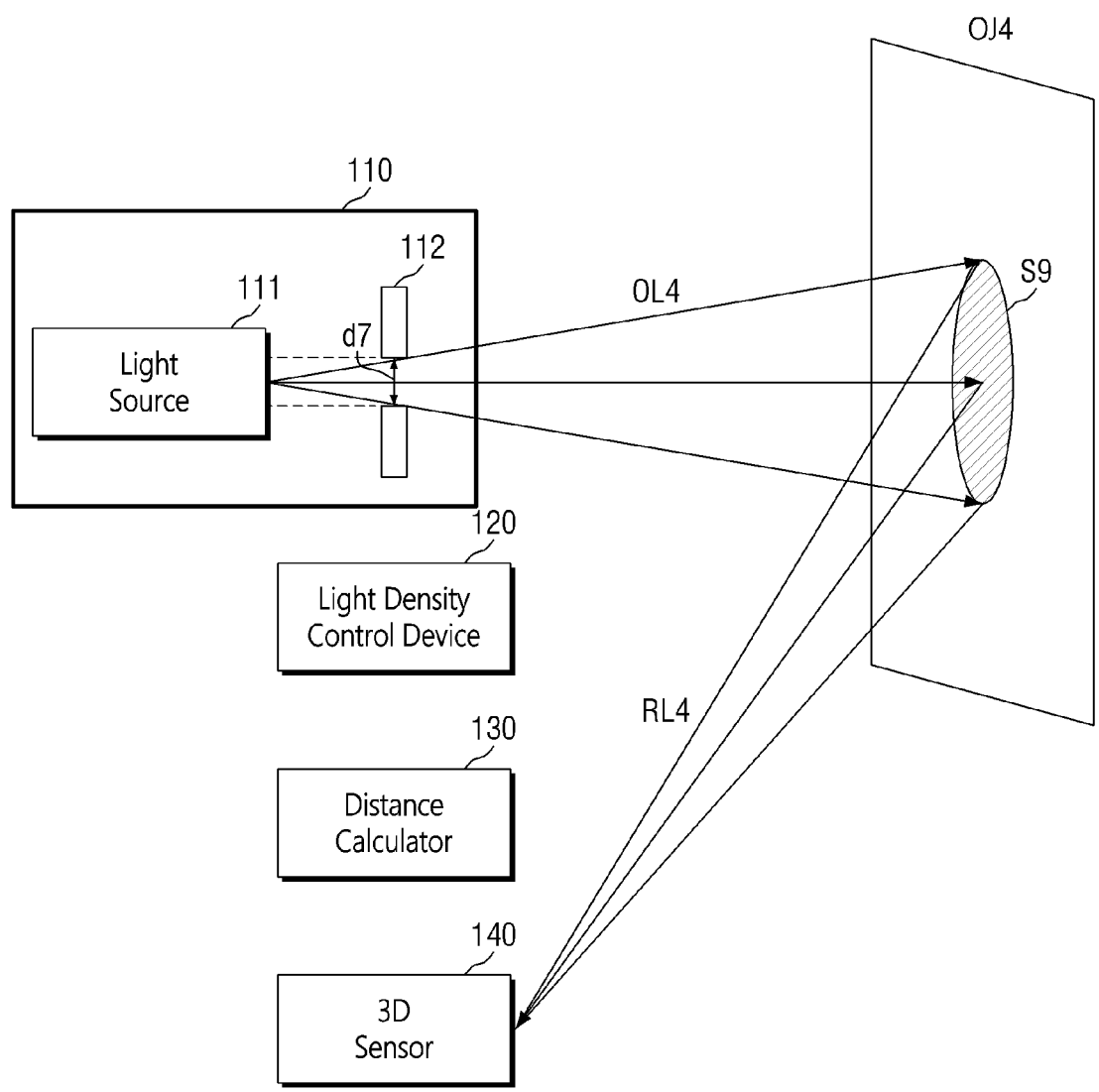
FIG. 18 is a diagram illustrating a state in which the output light is emitted to the second object for a second frame.
Figure 19:
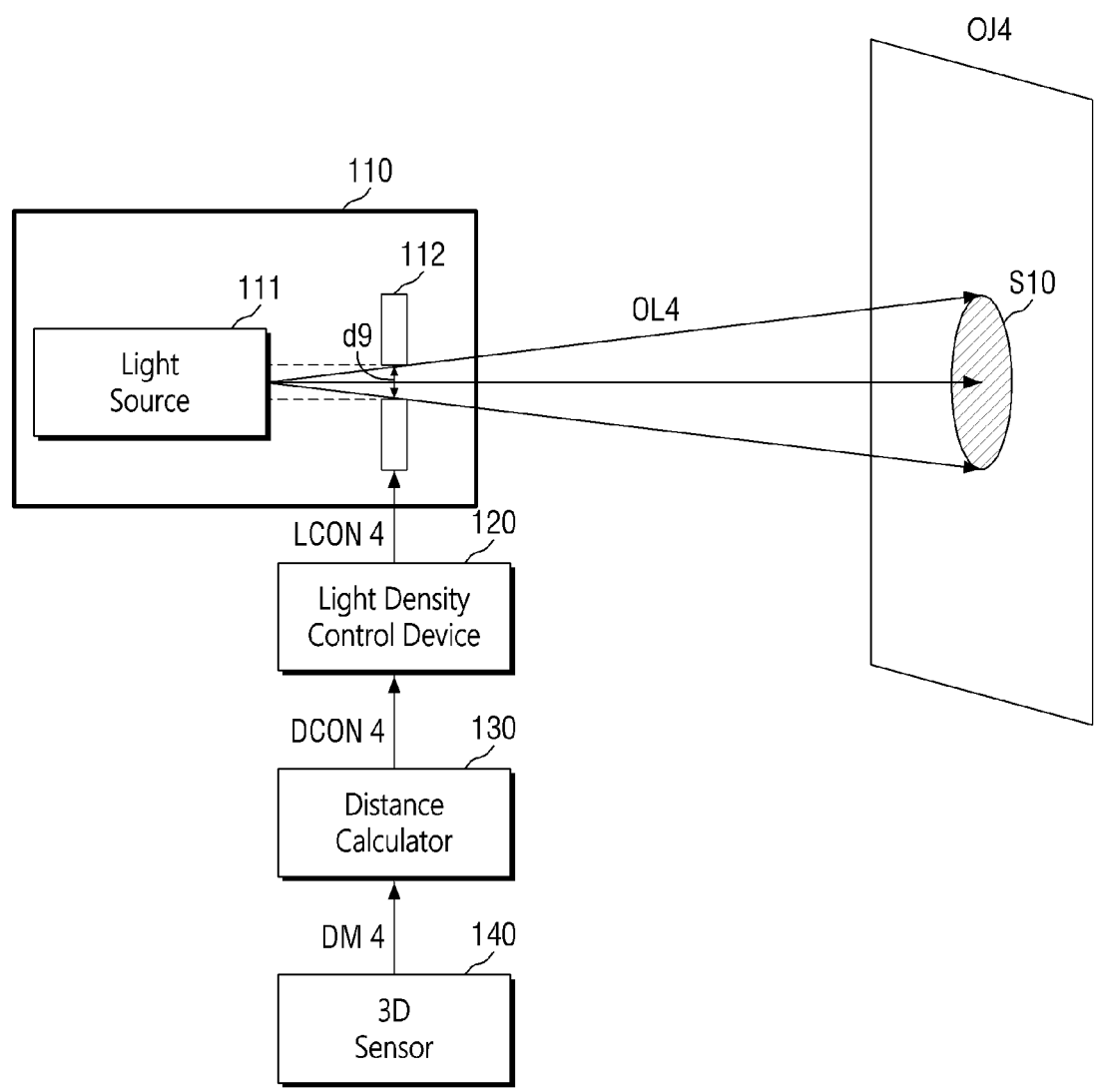
FIG. 19 is a diagram illustrating an optical area of the second object according to FIG. 18.

FIG. 14 is a flowchart illustrating a method of driving the TOF camera device according to some embodiments. FIG. 15 is a diagram illustrating optical areas of a first object and a second object according to a size of the opening of the LDC according to some embodiments. FIG. 16 is a diagram illustrating a state in which output light is emitted to the first object for a first frame. FIG. 17 is a diagram illustrating an optical area of the first object according to FIG. 16. FIG. 18 is a diagram illustrating a state in which the output light is emitted to the second object for a second frame. FIG. 19 is a diagram illustrating an optical area of the second object according to FIG. 18.

Referring to FIG. 14, for the first frame, first output light is emitted to the first object by the light module (S200).

Referring to FIG. 15, for the first frame, a first object OJ3 may be disposed at a position separated from the light module 110 by a first distance D1.

The light source 111 of the light module 110 may emit first output light OL3 to the first object OJ3. In this case, a gap of the opening of the LDC 112 through which the first output light OL3 is emitted may be a first gap d7. An area, to which the first output light OL3 is emitted onto the first object OJ3 may be a first area S6.

Next, for the first frame, the area, to which the first output light is emitted onto the first object is changed from the first area to a second area on the basis of first reflected light reflected by the first object (S210).

Referring to FIGS. 16 and 17, the 3D sensor 140 may receive first reflected light RL3 reflected by the first object OJ3. The 3D sensor 140 may generate a third 3D depth map DM3 on the basis of the first reflected light RL3. Since a description of the generation of the third 3D depth map DM3 by the 3D sensor 140 generating has been described with reference to FIGS. 5 and 6, the specific description thereof will be omitted.

The distance calculator 130 may receive the third 3D depth map DM3 generated by the 3D sensor 140 to generate a third distance data signal DCON3. The light density control device 120 may receive the third distance data signal DCON3 to output a third light density control signal LCON3.

The third light density control signal LCON3 may allow a size of the area, to which the first output light OL3 emitted by the light module 110 is emitted onto the first object OJ3 to be determined.

The gap of the opening of the LDC 112 may be adjusted in response to the third light density control signal LCON3. For example, the gap of the opening of the LDC 112 may be changed from the first gap d7 to a second gap d8. A size of the first gap d7 may be smaller than a size of the second gap d8. The size of the second gap d8 may be greater than the size of the first gap d7.

Since the gap of the opening of the LDC 112 is changed, the area, to which the first output light OL3 is emitted onto the first object OJ3 may be changed from a first area S7 to a second area S8. A size of the first area S7 may be smaller than a size of the second area S8.

Next, referring to FIG. 14, for the second frame subsequent to the first frame, second output light is emitted to a third area of the second object by the light module (S220).

Referring to FIGS. 15 and 18, for the second frame, a second object OJ4 may be disposed at a position separated from the light module 110 by a second distance D2. The second distance D2 may be different from the first distance D1. For example, the second distance D2 may be greater than the first distance D1.

The light source 111 of the light module 110 may emit second output light OL4 to the second object OJ4. In this case, the gap of the opening, through which the second output light OL4 is emitted, of the LDC 112 may be the first gap d7. An area, to which the second output light OL4 is emitted onto the second object OJ4 may be a third area S9.

Finally, for the second frame, the area, to which the second output light is emitted onto the second object is changed from the third area to a fourth area on the basis of second reflected light reflected by the second object (S230).

Referring to FIGS. 18 and 19, for the second frame, the 3D sensor 140 may receive second reflected light RL4 reflected by the second object OJ4. The 3D sensor 140 may generate a fourth 3D depth map DM4 on the basis of the second reflected light RL4. Since a description of the generation of the 3D depth map DM by the 3D sensor 140 has been described with reference to FIGS. 5 and 6, redundant description thereof will be omitted.

The distance calculator 130 may receive the fourth 3D depth map DM4 generated by the 3D sensor 140 to generate a fourth distance data signal DCON4. The light density control device 120 may receive the fourth distance data signal DCON4 to output a fourth light density control signal LCON4.

The fourth light density control signal LCON4 may allow a size of the area, to which the second output light OL4 emitted by the light module 110 is emitted onto the second object OJ4 to be determined.

The gap of the opening of the LDC 112 may be adjusted in response to the fourth light density control signal LCON4. For example, the gap of the opening of the LDC 112 may be changed from the first gap d7 to a second gap d9. The size of the first gap d7 may be greater than a size of the second gap d9.

Since the gap of the opening of the LDC 112 is changed, the area, to which the second output light OL4 is emitted onto the second object OJ4 may be changed from the third area S9 to a fourth area S10 The size of the fourth area S10 may be smaller than the size of the third area S9.

Accordingly, the size of the second area S8, to which the second output light OL4 is emitted onto the first object OJ3 for the first frame and the size of the fourth area S10, to which the second output light OL4 is emitted onto the second object OJ4 for second frame may be different. The size of the fourth area S10 may be smaller than the size of the second area S8.

Figure 20:
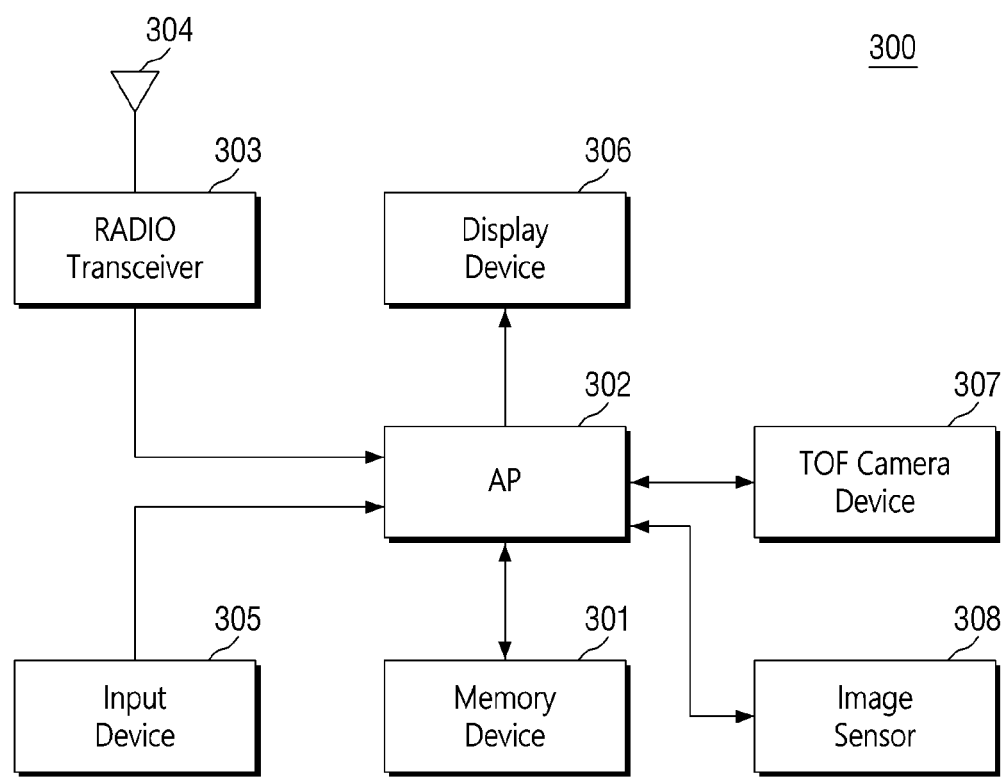
FIG. 20 is a diagram illustrating a computer system including the TOF camera device illustrated in FIG. 1 according to some embodiments.

FIG. 20 is a diagram illustrating a computer system including the TOF camera device illustrated in FIG. 1 according to some embodiments.

Referring to FIG. 20, a computer system 300 may be implemented as a smart phone, a personal digital assistant (PDA), a portable multimedia player (PMP), a Moving Picture Experts Group (MPEG)-3 Audio Layer 3 (MP3) player, an MPEG-4 Part 14 (MP4) player, or the like.

The computer system 300 may include a memory device 301, an application processor (AP) 302 including a memory controller configured to control the memory device 301, a wireless transceiver 303, an antenna 304, an input device 305, and a display device 306.

The wireless transceiver 303 may transmit or receive a wireless signal through the antenna 304. For example, the wireless transceiver 303 may convert the wireless signal received through the antenna 304 to a signal which may be processed by the AP 302.

Accordingly, the AP 302 may process the signal output from the wireless transceiver 303 and transmit the processed signal to the display device 306. The wireless transceiver 303 may convert the signal output from the AP 302 to a wireless signal and output the converted wireless signal to an external device through the antenna 304.

The input device 305 may be a device through which a control signal for controlling the operation of the AP 302 or data to be processed by the AP 302 is input. In some embodiments, the input device 305 may be implemented as a pointing device such as a touch pad or computer mouse, a keypad, or a keyboard.

In addition, the computer system 300 may further include a TOF camera device 307 for measuring a distance to an object and an image sensor 308 for capturing still or moving images. The AP 302 may transmit the still or moving images and distance information to the object received from the image sensor 308 to the display device 306.

For example, the TOF camera device 100 illustrated in FIG. 1 may be implemented as the TOF camera device 307.

Figure 21:
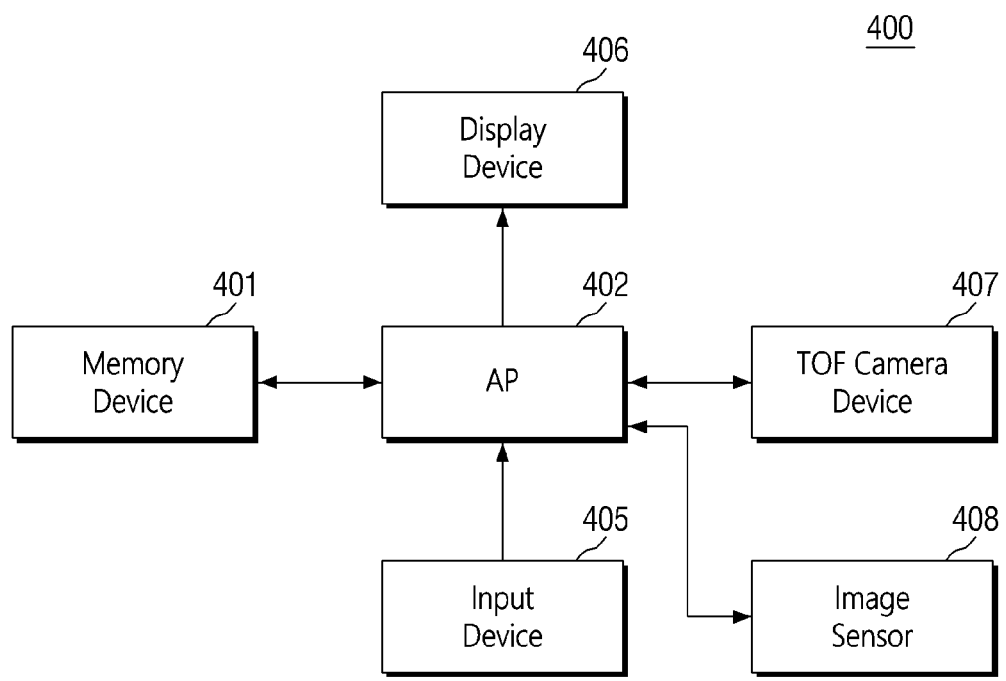
FIG. 21 is a diagram illustrating a computer system including the TOF camera device illustrated in FIG. 1 according to some embodiments.

FIG. 21 is a diagram illustrating a computer system including the TOF camera device illustrated in FIG. 1 according to some embodiments.

Referring to FIG. 21, a computer system 400 may be implemented as a personal computer (PC), a network server, a tablet PC, a net-book, or an e-reader.

The computer system 400 may include a memory device 401, an AP 402 including a memory controller capable of controlling a data processing operation of the memory device 401, an input device 405, and a display device 406. For example, the computer system 400 may be similar to the computer system 300, but might not include a transceiver for radio communication.

The AP 402 may display data stored in the memory device 401 through the display device 406 according to data input through the input device 405. For example, the input device 405 may be implemented as a pointing device such as a touch pad or a computer mouse, a keypad, or a keyboard. The AP 402 may control the overall operation of the computer system 400.

In addition, the computer system 400 may further include a TOF camera device 407 for measuring a distance to an object and an image sensor 408 for capturing still or moving images. The AP 402 may transmit the still or moving images and distance information to the object received from the image sensor 408 to the display device 406.

For example, the TOF camera device 407 may be implemented as the TOF camera device 100 illustrated in FIG. 1.

Figure 22:
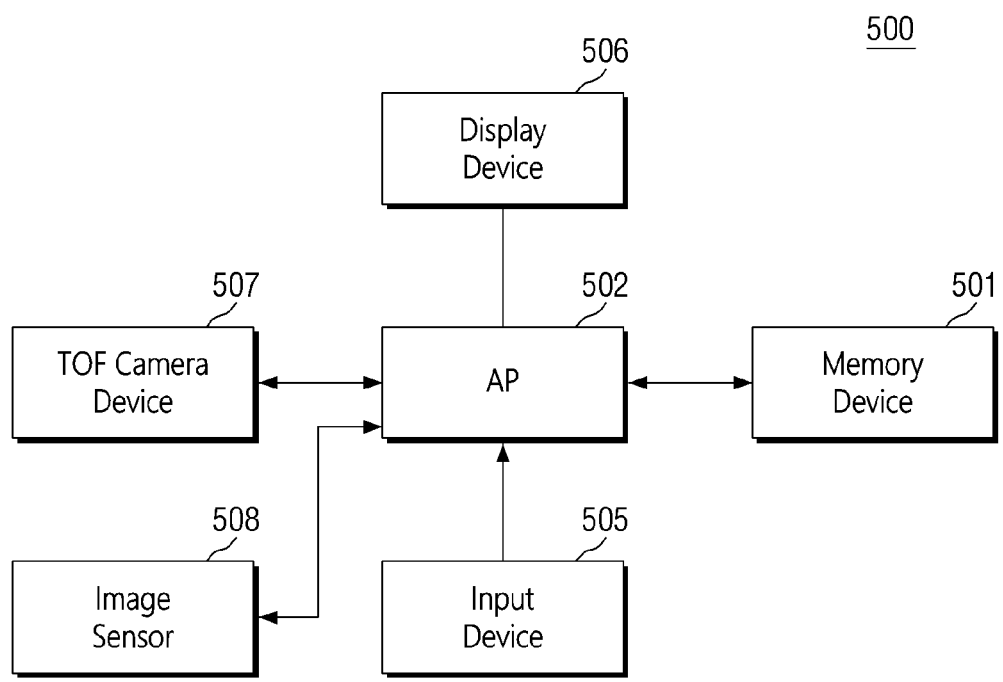
FIG. 22 is a diagram illustrating a computer system including the TOF camera device illustrated in FIG. 1 according to some embodiments.

FIG. 22 is a diagram illustrating a computer system including the TOF camera device illustrated in FIG. 1 according to some embodiments.

Referring to FIG. 22, a computer system 500 may be implemented as an image processing device, such as a digital camera or a mobile phone, a smart phone, or a tablet to which a digital camera is attached.

The computer system 500 may include a memory device 501, an AP 502 including a memory controller capable of controlling a data processing operation such as a write operation or a read operation of the memory device 501, an input device 505, an image sensor 508, a display device 506, and a TOF camera device 507. For example, the computer system 500 may be similar to the computer system 400; however, the computer system 500 may have a display device integrally formed within the system, and not necessarily as an external component.

The image sensor 508 converts an optical image to digital signals, and the converted digital signals are transmitted to the AP 502. The converted digital signals may be displayed through the display device 506 or stored in the memory device 501 according to control of the AP 502.

The TOF camera device 507 may measure a distance to an object. The AP 502 may transmit distance information to the display device 506. In addition, the AP 502 may transmit image date stored in the memory device 501 to the display device 506.

For example, the TOF camera device 507 may be implemented as the TOF camera device 100 illustrated in FIG. 1.

As is traditional in the field of the present invention, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

As described above, the TOF camera device and systems described herein may accurately track the distance of multiple objects over time. Specifically, a TOF camera device according to embodiments of the present disclosure may include a light density control device, which may be configured to determine the distance of one or more objects, and adjust a projected angle of light which determines a corresponding optical area onto the one or more objects, thereby tracking the one or more objects across a wide distance range with increased accuracy.

What is claimed is:

1. A time of flight (TOF) camera device comprising:
   a pulse generator configured to generate a pulse signal;
   a light module configured to emit an output light onto at least one object in response to the pulse signal;
   a three-dimensional (3D) sensor configured to receive reflected light when the output light is reflected by the at least one object for a first frame;
   a distance calculator configured to receive an output of the 3D sensor and generate a distance data signal; and
   a light density control device configured to receive the distance data signal from the distance calculator and output a light density control signal, wherein the light density control signal controls a size of an opening within the light module through which the output light is emitted to determine a size of a projected area onto the at least one object,
   wherein the light module emits the output light to a first area of the at least one object for the first frame, and wherein the light density control signal changes the size of the opening of the light module in response to the distance data signal to emit the output light to a second area of the at least one object in a second frame, wherein the second area is different from the first area.

2. The TOF camera device of claim 1, wherein the 3D sensor is configured to:
   generate time information of the received reflected light based on phase difference information, wherein the phase difference information comprises a difference between a phase of the output light of the light module and a phase of the reflected light reflected by the object; and
   generate a 3D depth map of the object based on the time information.

3. The TOF camera device of claim 2, wherein:
   the at least one object includes a first object separated from the light module by a first distance and a second object separated from the light module by a second distance greater than the first distance; and
   the 3D depth map is generated by combining a depth of the first object and a depth of the second object.

4. The TOF camera device of claim 2, wherein the 3D sensor generates the 3D depth map by successively combining rays of reflected light reflected by the at least one object.

5. The TOF camera device of claim 2, wherein the 3D sensor generates the 3D depth map by combining rays of the reflected light reflected by the at least one object.

6. The TOF camera device of claim 1, wherein:
   the light module includes a light density controller; and
   the light density controller adjusts the size of the opening, through which the output light is emitted, in response to the light density control signal.

7. The TOF camera device of claim 6, wherein the light density controller adjusts the size of the opening from a first size to a second size smaller than the first size in response to the light density control signal.

8. The TOF camera device of claim 6, wherein:
   the at least one object includes a first object separated from the light module by a first distance and a second object separated from the light module by a second distance greater than the first distance; and
   the light density control device selects the first object or the second object and outputs the light density control signal based on the selected object.

9. A method of driving a time of flight (TOF) camera device, comprising:
   generating a pulse signal;
   emitting output light in a first frame through an opening to a first area of at least one object in response to the pulse signal, wherein a size of the opening determines a projected area of light on the at least one object;
   receiving reflected light when the output light is reflected by the at least one object for the first frame;
   generating a distance data signal from the received reflected light;
   generating a light density control signal based on the distance data signal;
   changing the size of the opening through which the output light is emitted in a second frame based on the light density control signal; and
   emitting the output light through the opening to a second area of the at least one object, wherein the second area is different from the first area.

10. The method of claim 9, further comprising:
    generating time information of the received reflected light based on phase difference information between the output light and the reflected light reflected by the at least one object; and
    generating a three-dimensional (3D) depth map of the at least one object based on the time information,
    wherein the distance data signal is generated based on the 3D depth map.

11. The method of claim 10, wherein:
    the at least one object includes a first object separated from a light module by a first distance and a second object separated from the light module by a second distance greater than the first distance; and
    the 3D depth map is generated by combining a depth of the first object and a depth of the second object.

12. The method of claim 10, wherein the generating of the 3D depth map of the at least one object includes successively combining rays of the reflected light reflected by the at least one object to generate the 3D depth map.

13. The method of claim 10, wherein the generating of the 3D depth map of the at least one object includes combining rays of the reflected light reflected by the at least one object to generate the 3D depth map.

14. The method of claim 9, wherein the light density control signal based on the distance data signal controls the size of the opening through which the output light is emitted.

15. The method of claim 14, wherein the light density control signal allows the size of the opening to be adjusted from a first size to a second size smaller than the first size.

16. The method of claim 14, wherein:
    the at least one object includes a first object separated from a light module by a first distance and a second object separated from the light module by a second distance greater than the first distance; and
    the outputting of the light density control signal includes selecting the first object or the second object and outputting the light density control signal based on the selected object.

17. A method of driving a time of flight (TOF) camera device, comprising:
    emitting, by a light module, first output light to a first area of a first object for a first frame;
    changing an area, to which the first output light is emitted to the first object, from the first area to a second area based on first reflected light reflected by the first object for the first frame;

emitting, by the light module, second output light to a third area of a second object for a second frame subsequent to the first frame; and changing an area, to which the second output light is emitted to the second object, from a third area to a fourth area based on second reflected light reflected by the second object for the second frame, wherein a size of the second area is different from a size of the fourth area.

18. The method of claim 17, wherein:

the first object is disposed at a position separated from the light module by a first distance; and the second object is disposed at a position separated from the light module by a distance different from the first distance.

19. The method of claim 17, wherein:

a size of the first area is greater than the size of the second area; and a size of the third area is greater than the size of the fourth area.

20. The method of claim 17, wherein:

the first object is disposed at a position separated from the light module by a first distance;

the second object is disposed at a position farther from the light module than the first distance; and the size of the fourth area is smaller than the size of the second area.

* * * * *